United States Patent
Kakeshita et al.

(10) Patent No.: US 11,970,208 B2
(45) Date of Patent: Apr. 30, 2024

(54) VEHICLE COLLISION AVOIDANCE ASSIST APPARATUS

(71) Applicants: TOYOTA JIDOSHA KABUSHIKI KAISHA, Toyota (JP); DENSO CORPORATION, Kariya (JP)

(72) Inventors: Mafune Kakeshita, Toyota (JP); Yumi Shimanaka, Kasugai (JP); Sho Hashimoto, Shizuoka-ken (JP); Takuto Kozaki, Kariya (JP); Tooru Takahashi, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 220 days.

(21) Appl. No.: 17/578,618

(22) Filed: Jan. 19, 2022

(65) Prior Publication Data
US 2022/0234654 A1    Jul. 28, 2022

(30) Foreign Application Priority Data
Jan. 25, 2021    (JP) .................................. 2021-009413

(51) Int. Cl.
| | | |
|---|---|---|
| *B62D 15/02* | (2006.01) | |
| *B60W 30/09* | (2012.01) | |
| *B60W 30/095* | (2012.01) | |
| *B62D 6/00* | (2006.01) | |

(52) U.S. Cl.
CPC ......... *B62D 15/0265* (2013.01); *B60W 30/09* (2013.01); *B60W 30/095* (2013.01); *B62D 6/002* (2013.01)

(58) Field of Classification Search
CPC .... B62D 15/0265; B62D 6/002; B62D 6/003; B60W 30/09; B60W 30/08; B60W 2520/14
See application file for complete search history.

(56) References Cited

U.S. PATENT DOCUMENTS

| | | | |
|---|---|---|---|
| 2016/0240084 A1* | 8/2016 | Takeuchi | ................... B60T 7/22 |
| 2016/0280265 A1* | 9/2016 | Hass | ................... B62D 15/0265 |
| 2017/0057498 A1 | 3/2017 | Katoh | |

(Continued)

FOREIGN PATENT DOCUMENTS

JP    2017-043262 A    3/2017

*Primary Examiner* — Abby Y Lin
*Assistant Examiner* — Benjamin J Brosh
(74) *Attorney, Agent, or Firm* — Sughrue Mion, PLLC

(57) ABSTRACT

A vehicle collision avoidance assist apparatus executes a steering avoidance control of setting an avoidance route for avoiding the collision of the own vehicle with the object in a lane in which the own vehicle moves and executing an avoiding steering process of forcibly steering the own vehicle so as to move the own vehicle along the avoidance route when an index value representing a probability of collision of an own vehicle with an object ahead of the own vehicle becomes equal to or greater than a predetermined index value. The apparatus stops an execution of the steering avoidance control when a departing amount of the own vehicle from the avoidance route becomes equal to or greater than a predetermined departing amount while the electronic control unit executes the steering avoidance control. The predetermined departing amount is set for each of sections of the avoidance route.

4 Claims, 10 Drawing Sheets

(56) References Cited

U.S. PATENT DOCUMENTS

| | | | |
|---|---|---|---|
| 2018/0273087 A1* | 9/2018 | Schiebahn | B62D 1/286 |
| 2020/0023900 A1* | 1/2020 | Jonasson | B62D 15/0265 |
| 2020/0023901 A1* | 1/2020 | Modig | B62D 15/0265 |
| 2020/0047749 A1* | 2/2020 | Morotomi | B60W 30/09 |
| 2022/0379883 A1* | 12/2022 | Bruno | B60W 50/087 |
| 2023/0031053 A1* | 2/2023 | Kodama | B62D 6/00 |

* cited by examiner

VEHICLE COLLISION AVOIDANCE ASSIST APPARATUS

BACKGROUND

Field

The invention relates to a vehicle collision avoidance assist apparatus.

Description of the Related Art

There is known a vehicle collision avoidance assist apparatus which executes a forcibly braking control of forcibly braking and stopping an own vehicle to avoid collision of the own vehicle with an object ahead of the own vehicle when the own vehicle probably collides with the object. Also, there is known a vehicle collision avoidance assist apparatus which executes a steering avoidance control of forcibly steering the own vehicle to avoid the object to avoid the collision of the own vehicle with the object when the vehicle collision avoidance assist apparatus predicts that the own vehicle cannot avoid the collision with the object even by forcibly braking the own vehicle (for example, see JP 2017-43262 A).

In order to avoid the collision of the own vehicle with the object by the steering avoidance control, the own vehicle is forcibly steered right and left. When the own vehicle is forcibly steered right and left, and the own vehicle is considerably deviated or departed from the avoidance route, preferably, an execution of the steering avoidance control should be stopped. In order to stop executing the steering avoidance control appropriately, a condition that a departing amount of the own vehicle from the avoidance route can be employed as a condition of stopping executing the steering avoidance control. However, if this condition is employed, the execution of the steering avoidance control may be stopped at an excessively late or early timing.

SUMMARY

An object of the invention is to provide a vehicle collision avoidance assist apparatus which can appropriately stop the execution of the steering avoidance control.

According to the invention, a vehicle collision avoidance assist apparatus comprises an electronic control unit configured to execute a steering avoidance control. The steering avoidance control is a control of setting an avoidance route for avoiding the collision of the own vehicle with the object in a lane in which the own vehicle moves and executing an avoiding steering process of forcibly steering the own vehicle so as to move the own vehicle along the avoidance route when an index value representing a probability of collision of an own vehicle with an object ahead of the own vehicle becomes equal to or greater than a predetermined index value. The electronic control unit is configured to stop an execution of the steering avoidance control when a departing amount of the own vehicle from the avoidance route becomes equal to or greater than a predetermined departing amount while the electronic control unit executes the steering avoidance control. The predetermined departing amount is set for each of sections of the avoidance route.

If the execution of the avoiding steering process is continued after the own vehicle is considerably departed from the avoidance route, the own vehicle may collide with the object. With the invention, the execution of the steering avoidance control is stopped when the departing amount of the own vehicle from the avoidance route becomes equal to or greater than the predetermined departing amount. Thus, the collision of the own vehicle with the object can be prevented when the own vehicle may collide with the object due to the execution of the avoiding steering process of the steering avoidance control being continued.

Further, while the own vehicle is moved along the avoidance route by the avoiding steering process, the steering angle of the own vehicle is increased, decreased, and kept. When the own vehicle is moved properly by the avoiding steering process, the departing amount of the own vehicle from the avoidance route with the steering angle of the own vehicle being increased and decreased, tends to be greater than the departing amount of the own vehicle from the avoidance route with the steering angle of the own vehicle being kept. That is, even when the own vehicle is properly moved by the avoiding steering process, the departing amount of the own vehicle from the avoidance route varies, depending on which section of the avoidance route the own vehicle moves. Thus, if the predetermined departing amount is set to a fixed value, independently of whether the steering angle of the own vehicle is increased, decreased, or maintained by the avoiding steering process, the execution of the steering avoidance control is not stopped even when the execution of the steering avoidance control should be stopped. Alternatively, even when the execution of the steering avoidance control should not be stopped, the execution of the steering avoidance control is stopped. With the invention, the predetermined departing amount is set for each of the sections of the avoidance route. Thus, the execution of the steering avoidance control can be appropriately stopped.

According to an aspect of the invention, the sections of the avoidance route may include (i) at least one steering section of the avoidance route that the steering angle of the own vehicle is increased or decreased by the avoiding steering process and (ii) at least one steering keeping section of the avoidance route that the steering angle of the own vehicle is kept. In this aspect, a first departing amount may be set as the predetermined departing amount when the own vehicle is moved in the steering section of the avoidance route by the avoiding steering process. Further, in this aspect, a second departing amount smaller than the first departing amount may be set as the predetermined departing amount when the own vehicle is moved in the steering keeping section of the avoidance route by the avoiding steering process.

In general, even when the own vehicle is properly moved by the avoiding steering process, the departing amount of the own vehicle from the avoidance route when the own vehicle is moved in the steering section of the avoidance route, tends to be greater than the departing amount of the own vehicle from the avoidance route when the own vehicle is moved in the maintaining section of the avoidance route. With this aspect of the invention, the first departing amount set as the predetermined departing amount when the own vehicle is moved in the steering section of the avoidance route, is greater than the second departing amount set as the predetermined departing amount when the own vehicle is moved in the maintaining section of the avoidance route. Thus, the execution of the steering avoidance control is appropriately stopped.

According to another aspect of the invention, the predetermined departing amount set when the own vehicle is departed from the avoidance route in an opposite direction to a turning direction of the own vehicle achieved by the avoiding steering process, may be smaller than the predetermined departing amount set when the own vehicle is departed from the avoidance route in the same direction as the turning direction of the own vehicle achieved by the avoiding steering process.

Even when the own vehicle is departed from the avoidance route in the same direction as the turning direction of the own vehicle achieved by the avoiding steering process, and the departing amount is a certain amount, the own vehicle may not have an unstable moving behavior due to a slip of wheels of the vehicle. However, when the own vehicle is departed from the avoidance route in the opposite direction to the turning direction of the own vehicle achieved by the avoiding steering process, and the departing amount is the same certain amount, the own vehicle may have an unstable moving behavior due to a slip of the wheels of the vehicle, and thus the own vehicle may collide with the object. In this case, the execution of the steering avoidance control should be stopped. With this aspect of the invention, the predetermined departing amount to be compared with the departing amount when the own vehicle is departed from the avoidance route in the opposite direction to the turning direction of the own vehicle achieved by the avoiding steering process, is smaller than the predetermined departing amount to be compared with the departing amount when the own vehicle is departed from the avoidance route in the same direction as the turning direction of the own vehicle achieved by the avoiding steering process. Thus, the collision of the own vehicle with the object can be prevented when the own vehicle is departed from the avoidance route in the opposite direction to the turning direction of the own vehicle achieved by the avoiding steering process.

According to further another aspect of the invention, the index value may be a predicted reaching time which is a time predictively taken for the own vehicle to reach the object. In this aspect, the index value may increase as the predicted reaching time decreases. Further, in this aspect, the predicted reaching time may be acquired, based on (i) a distance between the own vehicle and the object and (ii) a relative moving speed of the own vehicle with respect to the object. Furthermore, in this aspect, the steering avoidance control may be executed when the predicted reaching time becomes a predetermined predicted reaching time which corresponds to the predetermined index value.

In order to execute the steering avoidance control with preventing an unnecessary execution of the steering avoidance control, it is effective to determine a timing of starting the execution of the steering avoidance control, based on the time taken for the own vehicle to reach the object. With this aspect of the invention, whether the execution of the steering avoidance control should be started, is determined, based on the time predictively taken for the own vehicle to reach the object (i.e., the predicted reaching time) as the index value. Thus, the steering avoidance control can be executed with preventing the unnecessary execution of the steering avoidance control.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
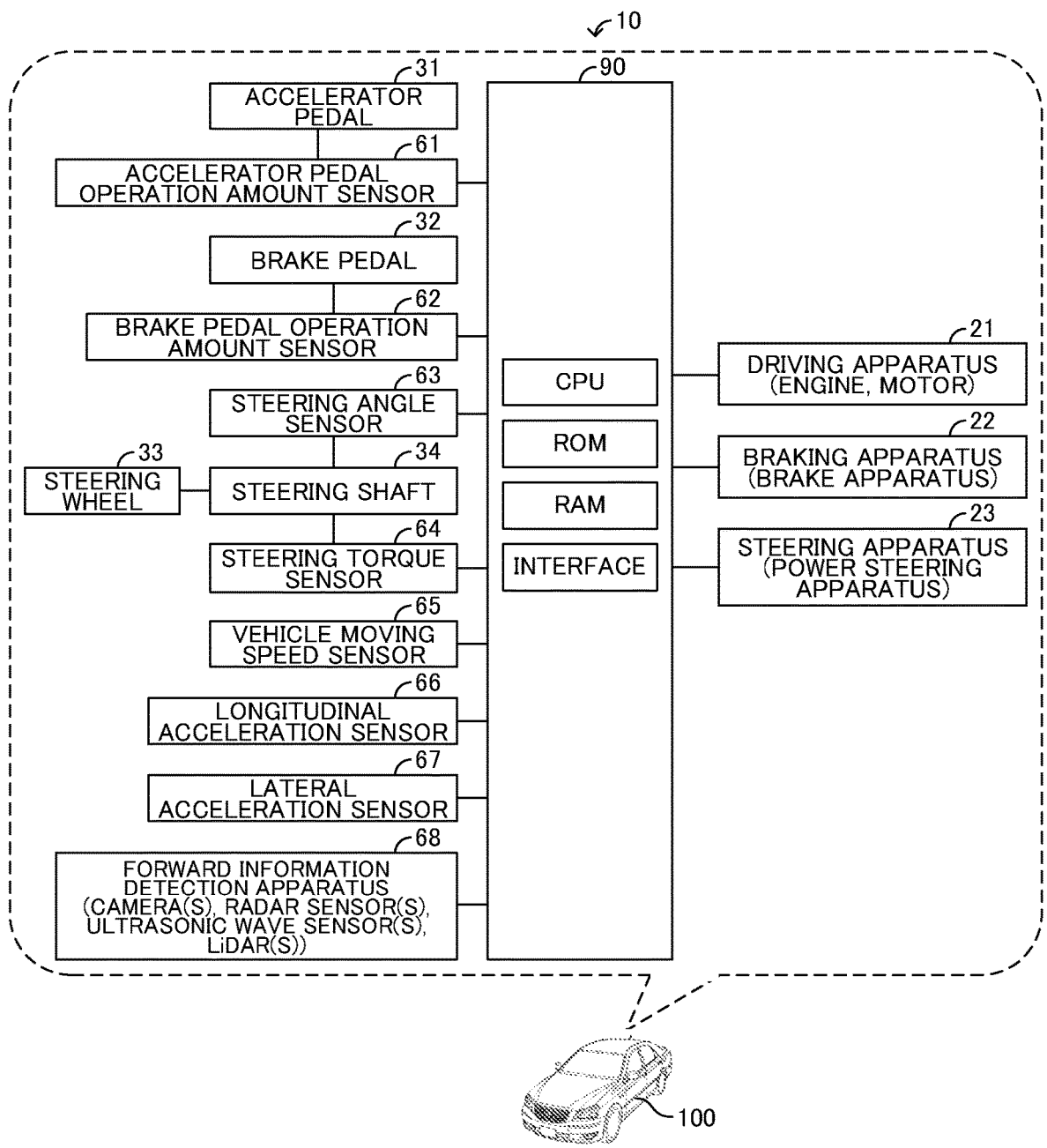
FIG. 1 is a view which shows a vehicle collision avoidance assist apparatus according to an embodiment of the invention and an own vehicle on which the vehicle collision avoidance assist apparatus according to the embodiment of the invention is installed.

Below, a vehicle collision avoidance assist apparatus according to an embodiment of the invention will be described with reference to the drawings. As shown in FIG. 1, the vehicle collision avoidance assist apparatus 10 according to the embodiment of the invention is installed on an own vehicle 100.

<ECU>

As shown in FIG. 1, the vehicle collision avoidance assist apparatus 10 includes an ECU 90. ECU stands for electronic control unit. The ECU 90 includes a micro-computer as a main component. The micro-computer includes a CPU, a ROM, a RAM, a non-volatile memory, and an interface. The CPU is configured or programmed to realize various functions by executing instructions, programs, or routines stored in the ROM.

<Driving Apparatus, Etc.>

Moreover, a driving apparatus 21, a braking apparatus 22, and a steering apparatus 23 are installed on the own vehicle 100.

<Driving Apparatus>

The driving apparatus 21 is an apparatus which outputs a driving force to be applied to the own vehicle 100 to move the own vehicle 100. The driving apparatus 21 is, for example, an internal combustion engine and at least one electric motor. The driving apparatus 21 is electrically connected to the ECU 90. The ECU 90 can control the driving force output from the driving apparatus 21 by controlling an activation of the driving apparatus 21.

<Braking Apparatus>

The braking apparatus 22 is an apparatus which outputs a braking force to be applied to the own vehicle 100 to brake the own vehicle 100. The braking apparatus 22 is, for example, a brake apparatus. The braking apparatus 22 is electrically connected to the ECU 90. The ECU 90 can control the braking force output from the braking apparatus 22 by controlling an activation of the braking apparatus 22.

<Steering Apparatus>

The steering apparatus 23 is an apparatus which outputs a steering force to be applied to the own vehicle 100 to steer the own vehicle 100. The steering apparatus 23 is, for example, a power steering apparatus. The steering apparatus 23 is electrically connected to the ECU 90. The ECU 90 can control the steering force output from the steering apparatus 23 by controlling an activation of the steering apparatus 23.

<Sensors, Etc.>

Moreover, an accelerator pedal operation amount sensor 61, a brake pedal operation amount sensor 62, a steering angle sensor 63, a steering torque sensor 64, a vehicle moving speed sensor 65, a longitudinal acceleration sensor 66, a lateral acceleration sensor 67, and a forward information detection apparatus 68.

<Accelerator Pedal Operation Amount Sensor>

The accelerator pedal operation amount sensor 61 is electrically connected to the ECU 90. The accelerator pedal operation amount sensor 61 detects an operation amount of an accelerator pedal 31. The accelerator pedal operation amount sensor 61 sends information on the detected operation amount to the ECU 90. The ECU 90 acquires the operation amount of the accelerator pedal 31 as an accelerator pedal operation amount AP, based on the information sent from the accelerator pedal operation amount sensor 61. The ECU 90 calculates and acquires a requested driving force PDreq, based on the accelerator pedal operation amount AP and a vehicle moving speed V100 of the own vehicle 100. The requested driving force PDreq is a driving force requested for the driving apparatus 21 to output.

<Brake Pedal Operation Amount Sensor>

The brake pedal operation amount sensor 62 is electrically connected to the ECU 90. The brake pedal operation amount sensor 62 detects an operation amount of a brake pedal 32. The brake pedal operation amount sensor 62 sends information on the detected operation amount to the ECU 90. The ECU 90 acquires the operation amount of the brake pedal 32 as a brake pedal operation amount BP, based on the information sent from the brake pedal operation amount sensor 62. The ECU 90 calculates and acquires a requested braking force PBreq, based on the brake pedal operation amount BP. The requested braking force PBreq is a braking force requested for the braking apparatus 22 to output.

<Steering Angle Sensor>

The steering angle sensor 63 is electrically connected to the ECU 90. The steering angle sensor 63 detects a rotation angle of a steering wheel 33 of the own vehicle 100 from a neutral position of the steering wheel 33. The steering angle sensor 63 sends information on the detected rotation angle to the ECU 90. The ECU 90 acquires the rotation angle of the steering wheel 33 from the neutral position as a steering angle SA, based on the information sent from the steering angle sensor 63.

<Steering Torque Sensor>

The steering torque sensor 64 is electrically connected to the ECU 90. The steering torque sensor 64 detects a torque which a driver of the own vehicle 100 inputs to a steering shaft 34 via the steering wheel 33. The steering torque sensor 64 sends information on the detected torque to the ECU 90. The ECU 90 acquires the torque which the driver inputs to the steering shaft 34 via the steering wheel 33 as a driver input torque TQdr, based on the information sent from the steering torque sensor 64.

<Vehicle Moving Speed Sensor>

The vehicle moving speed sensor 65 is electrically connected to the ECU 90. The vehicle moving speed sensor 65 detects rotation speeds of wheels of the own vehicle 100. The vehicle moving speed sensor 65 sends information on the detected rotation speeds of the wheels of the own vehicle 100. The ECU 90 acquires the moving speed of the own vehicle 100 as the vehicle moving speed V100, based on the information sent from the vehicle moving speed sensor 65.

In addition, the ECU 90 calculates and acquires a torque to be applied to the steering shaft 34 from the steering apparatus 23 as an assist steering torque TQas, based on the driver input torque TQdr and the vehicle moving speed V100. The assist steering torque TQas is a torque applied to the steering shaft 34 to assist a steering operation to the steering wheel 33 carried out by the driver.

<Longitudinal Acceleration Sensor>

The longitudinal acceleration sensor 66 is electrically connected to the ECU 90. The longitudinal acceleration sensor 66 detects an acceleration of the own vehicle 100 in a longitudinal direction of the own vehicle 100. The longitudinal acceleration sensor 66 sends information on the detected acceleration to the ECU 90. The ECU 90 acquires the acceleration of the own vehicle 100 in the longitudinal direction of the own vehicle 100 as a longitudinal acceleration Gx, based on the information sent from the longitudinal acceleration sensor 66.

<Lateral Acceleration Sensor>

The lateral acceleration sensor 67 is electrically connected to the ECU 90. The lateral acceleration sensor 67 detects an acceleration of the own vehicle 100 in a lateral direction of the own vehicle 100. The lateral acceleration sensor 67 sends information on the detected acceleration to the ECU 90. The ECU 90 acquires the acceleration of the own vehicle 100 in the lateral direction of the own vehicle 100 as a lateral acceleration Gy, based on the information sent from the lateral acceleration sensor 67.

<Forward Information Detection Apparatus>

The forward information detection apparatus 68 is an apparatus which detects information on a situation ahead of the own vehicle 100. The forward information detection apparatus 68 includes, for example, at least one camera, at least one radar sensor such as at least one millimeter wave radar, at least one ultrasonic wave sensor such as at least one clearance sonar, and at least one laser radar such as at least one LiDAR.

The forward information detection apparatus 68 is electrically connected to the ECU 90. The forward information detection apparatus 68 detects information on the situation ahead of the own vehicle 100. The forward information detection apparatus 68 sends the detected information (forward information IF) to the ECU 90.

Figure 2A:
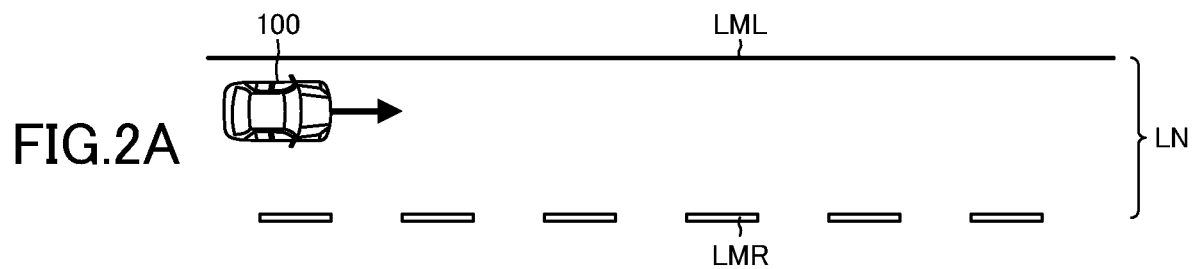
FIG. 2A is a view which shows lane markings which define a lane in which the own vehicle moves.

The ECU 90 can detect an object 200 ahead of the own vehicle 100, based on the forward information I_F. Moreover, when the ECU 90 detects the object 200, the ECU 90 can acquire an object distance D200, a relative moving speed dV, and a moving direction of the object 200, based on the forward information I_F. The object distance D200 is a distance between the object 200 and the own vehicle 100. The relative moving speed dV is a relative moving speed of the own vehicle 100 with respect to the object 200. In addition, the ECU 90 can recognize a left lane marking LML and a right lane marking LMR (see FIG. 2A) which define an own vehicle moving lane LN, based on the forward information I_F. The own vehicle moving lane LN is a moving lane of the own vehicle 100. Otherwise, the ECU 90 can recognize an end of a road on which the own vehicle 100 moves, based on the forward information IF. That is, the ECU 90 can recognize a road end, based on the forward information I_F.

Figure 2B:
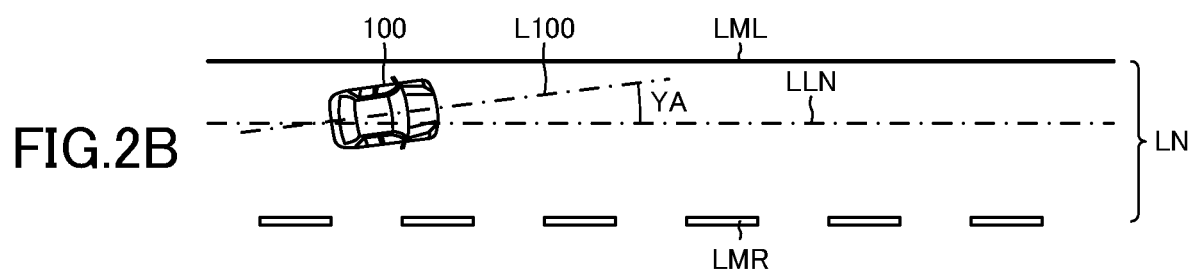
FIG. 2B is a view which shows a yaw angle of the own vehicle.
Figure 2C:
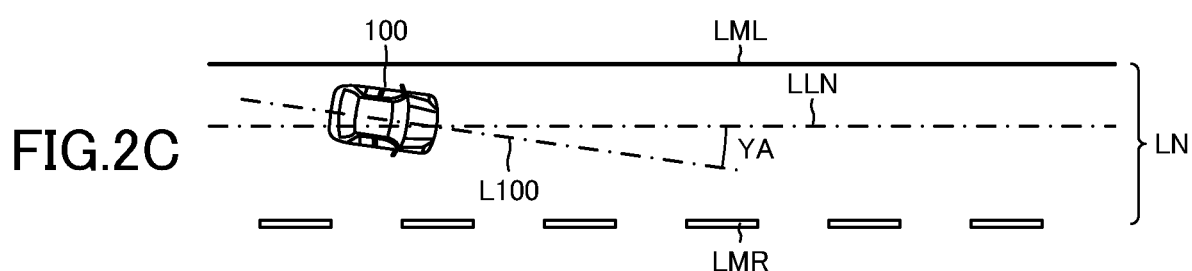
FIG. 2C is a view which shows the yaw angle of the own vehicle.

Then, the ECU 90 acquires a yaw angle YA, based on the recognized left and right lane markings LML and LMR or the recognized road end. As shown in FIG. 2B and FIG. 2C, the yaw angle YA is an angle between an own vehicle moving lane extending direction line LLN and an own vehicle longitudinal extending center line L100. The own vehicle moving lane extending direction line LLN is a line which represents an extending direction of the own vehicle moving lane LN. The own vehicle longitudinal extending center line L100 is a line which extends through a center of a width of the own vehicle 100 in the longitudinal direction of the own vehicle 100.

<Summary of Operations of Vehicle Collision Avoidance Assist Apparatus>

Next, a summary of operations of the vehicle collision avoidance assist apparatus 10 will be described. While the own vehicle 100 moves, the vehicle collision avoidance assist apparatus 10 determines, based on the forward information I_F, whether there is an object ahead of the own vehicle 100. In this embodiment, the object is a vehicle, a person, a bicycle, or a guard rail.

When there is an object ahead of the own vehicle 100, and a probability that the own vehicle 100 collides with the object has been increased to a high level, the vehicle collision avoidance assist apparatus 10 determines whether there is space at the side of the object where the own vehicle 100 can move and avoid the object. When there is the space, the vehicle collision avoidance assist apparatus 10 executes a steering avoidance control of steering the own vehicle 100 to avoid the object, using the space.

It should be noted that the vehicle collision avoidance assist apparatus 10 may be configured to execute an alerting process of informing the driver of the own vehicle 100 that the own vehicle 100 may collide with the object before the vehicle collision avoidance assist apparatus 10 starts an execution of the steering avoidance control. In this case, when the driver does not carry out an operation of avoiding the collision of the own vehicle 100 with the object such as an operation to the accelerator pedal 31, an operation to the brake pedal 32, and an operation to the steering wheel 33 even by executing the alerting process, the vehicle collision avoidance assist apparatus 10 executes a forcibly braking process of forcibly braking the own vehicle 100 to stop the own vehicle 100. In this case, when the own vehicle 100 probably collides with the object even by executing the forcibly braking process, the vehicle collision avoidance assist apparatus 10 executes the steering avoidance control.

Further, the vehicle collision avoidance assist apparatus 10 executes a normal moving control when there is no object ahead of the own vehicle 100 or when there is the object ahead of the own vehicle 100 but the vehicle collision avoidance assist apparatus 10 predicts that the own vehicle 100 does not collide with the object. The normal moving control is a control of controlling the activation of the driving apparatus 21 to cause the driving apparatus 21 to output the driving force corresponding to the requested driving force PDreq when the requested driving force PDreq is greater than zero. In addition, the normal moving control is a control of controlling the activation of the braking apparatus 22 to cause the braking apparatus 22 to output the braking force corresponding to the requested braking force PBreq when the requested braking forc'e PBreq is greater than zero. In addition, the normal moving control is a control of controlling the activation of the steering apparatus 23 to cause the steering apparatus 23 to output the steering torque corresponding to the assist steering torque TQas when the assist steering torque TQas is greater than zero.

<Steering Avoidance Control>

Next, the steering avoidance control will be described.

Figure 3A:
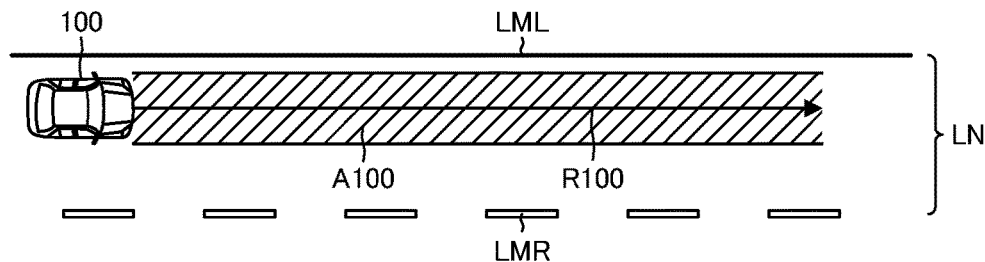
FIG. 3A is a view which shows an own vehicle moving area.

While the own vehicle 100 moves, the vehicle collision avoidance assist apparatus 10 determines, based on the forward information I_F, whether there is an object 200 in an own vehicle moving area A100. As shown in FIG. 3A, the own vehicle moving area A100 is an area which has (i) a center line corresponding to a moving route R100 of the own vehicle 100 and (ii) a width equal to the width of the own vehicle 100. The moving route R100 of the own vehicle 100 is a route along which the own vehicle 100 predictively moves assuming that the own vehicle 100 moves with maintaining the current steering angle SA.

When the vehicle collision avoidance assist apparatus 10 determines that there is the object 200 in the own vehicle moving area A100, the vehicle collision avoidance assist apparatus 10 acquires an object distance D200 and a relative moving speed dV. The object distance D200 is a distance between the object 200 and the own vehicle 100. The relative moving speed dV is a moving speed of the own vehicle 100 with respect to the object 200. Then, the vehicle collision avoidance assist apparatus 10 calculates and acquires a predicted reaching time TTC by dividing the object distance D200 by the relative moving speed dV (TTC=D200/dV). The predicted reaching time TTC is a time which the own vehicle 100 predictively takes to reach the object 200. While the vehicle collision avoidance assist apparatus 10 determines that there is the object 200 in the own vehicle moving area A100, the vehicle collision avoidance assist apparatus 10 acquires the predicted reaching time TTC with a predetermined calculation cycle CYC.

Figure 3B:
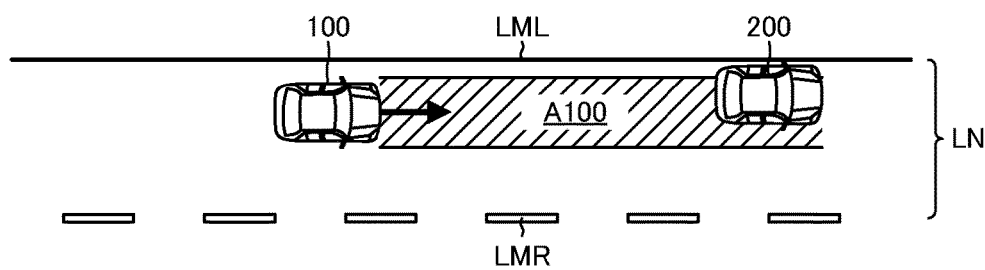
FIG. 3B is a view which shows a scene that a vehicle as an object is in the own vehicle moving area.

When the relative moving speed dV is constant, the predicted reaching time TTC decreases as the object distance D200 decreases. As shown in FIG. 3B, when the own vehicle 100 approaches the object 200, and the predicted reaching time TTC decreases to a predetermined time (this predetermined time will be hereinafter referred to as "predetermined predicted reaching time TTCth"), the vehicle collision avoidance assist apparatus 10 determines that a steering avoiding condition becomes satisfied. That is, when (i) the vehicle collision avoidance assist apparatus 10 acquires the predicted reaching time TTC as an index value which represents the probability that the own vehicle 100 collides with the object 200, and z(ii) the index value becomes equal to or greater than a predetermined index value, the vehicle collision avoidance assist apparatus 10 determines that the probability that the own vehicle 100 collides with the object has increased to a high level. Thus, in this embodiment, the index value which represents the probability that the own vehicle 100 collides with the object 200 increases as the predicted reaching time TTC decreases.

When the steering avoiding condition becomes satisfied, the vehicle collision avoidance assist apparatus 10 starts executing the steering avoidance control. When the vehicle collision avoidance assist apparatus 10 starts executing the steering avoidance control, the vehicle collision avoidance assist apparatus 10 determines whether the driver operates the steering wheel 33 so as to cause the own vehicle 100 to pass by the object 200.

Figure 3C:
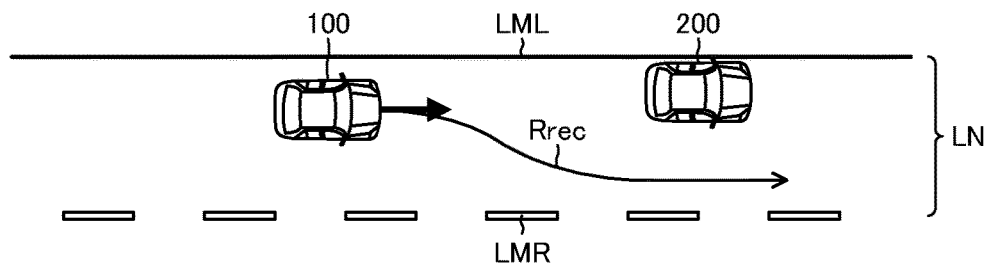
FIG. 3C is a view which shows a recommended avoidance route along which the own vehicle is moved to avoid the vehicle as the object.

When the vehicle collision avoidance assist apparatus 10 determines that the driver operates the steering wheel 33 so as to move the own vehicle 100 to avoid the object 200, as shown in FIG. 3C, the vehicle collision avoidance assist apparatus 10 sets a recommended avoidance route Rrec. The recommended avoidance route Rrec is a route recommended to move the own vehicle 100 to avoid the object 200.

In this embodiment, the vehicle collision avoidance assist apparatus 10 sets, as the recommended avoidance route Rrec, a route to move the own vehicle 100 in the own vehicle moving lane LN and avoid the object 200. In other words, the vehicle collision avoidance assist apparatus 10 sets, as the recommended avoidance route Rrec, a route to move the own vehicle 100 and avoid the object 200, preventing the own vehicle 100 from moving out of the own vehicle moving lane LN.

Further, in order to avoid the collision of the own vehicle 100 with the object 200 by forcibly steering the own vehicle 100 to move the own vehicle 100 along the recommended avoidance route Rrec, the vehicle collision avoidance assist apparatus 10 should set the recommended avoidance route Rrec, depending on the relative moving speed dV of the own vehicle 100 with respect to the object 200. Accordingly, the vehicle collision avoidance assist apparatus 10 is configured to set the recommended avoidance route Rrec in consideration of the relative moving speed dV of the own vehicle 100 with respect to the object 200.

Further, in this embodiment, the vehicle collision avoidance assist apparatus 10 sets the recommended avoidance route Rrec, depending on the operation applied to the steering wheel 33 by the driver. In particular, when the driver rotates the steering wheel 33 clockwise, the vehicle collision avoidance assist apparatus 10 sets, as the recommended avoidance route Rrec, a route passing the right side of the object 200. On the other hand, when the driver rotates the steering wheel 33 counterclockwise, the vehicle collision avoidance assist apparatus 10 sets, as the recommended avoidance route Rrec, a route passing the left side of the object 200.

After the vehicle collision avoidance assist apparatus 10 sets the recommended avoidance route Rrec, the vehicle collision avoidance assist apparatus 10 executes a process of steering the own vehicle 100 by increasing and decreasing the assist steering torque TQas, depending on the driver input torque TQdr so as to move the own vehicle 100 within a predetermined distance Dy from the recommended avoidance route Rrec. Hereinafter, this process of steering the own vehicle 100 will be referred to as "first avoiding steering process" or "assist steering process". Thus, after the vehicle collision avoidance assist apparatus 10 sets the recommended avoidance route Rrec, the vehicle collision avoidance assist apparatus 10 executes the first avoiding steering process of controlling the assist steering torque TQas so as to move the own vehicle 100 within the predetermined distance Dy from the recommended avoidance route Rrec. Thus, the first avoiding steering process is realized by controlling the assist steering torque TQas in consideration of the driver input torque TQdr.

It should be noted that the vehicle collision avoidance assist apparatus 10 may be configured to decelerate the own vehicle 100 by decreasing the driving force applied to the own vehicle 100 or limiting the driving force applied to the own vehicle 100 to a certain value or less or applying the braking force to the own vehicle 100 in addition to executing the first avoiding steering process.

Figure 3D:
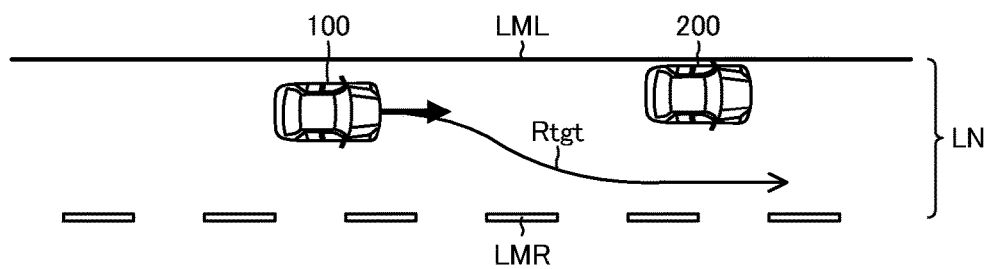
FIG. 3D is a view which shows a target avoidance route along which the own vehicle is moved to avoid the vehicle as the object.

On the other hand, when the vehicle collision avoidance assist apparatus 10 determines that the driver does not operate the steering wheel 33 to cause the own vehicle 100 to avoid the object 200 when (i) the steering avoiding condition becomes satisfied, and (ii) the vehicle collision avoidance assist apparatus 10 starts executing the steering avoidance control, as shown in FIG. 3D, the vehicle collision avoidance assist apparatus 10 sets a target avoidance route Rtgt to move the own vehicle 100 to avoid the object 200.

In this embodiment, the vehicle collision avoidance assist apparatus 10 sets, as the target avoidance route Rtgt, a route to move the own vehicle 100 in the own vehicle moving lane LN and avoid the object 200. In other words, the vehicle collision avoidance assist apparatus 10 sets, as the target avoidance route Rtgt, a route to move the own vehicle 100 and avoid the object 200, preventing the own vehicle 100 from moving out of the own vehicle moving lane LN.

Further, in order to avoid the collision of the own vehicle 100 with the object 200 by forcibly steering the own vehicle 100 to move the own vehicle 100 along the target avoidance route Rtgt, the vehicle collision avoidance assist apparatus 10 should set the target avoidance route Rtgt, depending on the relative moving speed dV of the own vehicle 100 with respect to the object 200. Accordingly, the vehicle collision avoidance assist apparatus 10 is configured to set the target avoidance route Rtgt in consideration of the relative moving speed dV of the own vehicle 100 with respect to the object 200.

After the vehicle collision avoidance assist apparatus 10 sets the target avoidance route Rtgt, the vehicle collision avoidance assist apparatus 10 executes a process of steering the own vehicle 100 by controlling the assist steering torque TQas to move the own vehicle 100 along the target avoidance route Rtgt. Hereinafter, this process of steering the own vehicle 100 will be referred to as "second avoiding steering process" or "autonomous steering process". Thus, the second avoiding steering process is realized by controlling the assist steering torque TQas without considering the driver input torque TQdr.

It should be noted that the vehicle collision avoidance assist apparatus 10 may be configured to decelerate the own vehicle 100 by decreasing the driving force applied to the own vehicle 100 or limiting the driving force applied to the own vehicle 100 to a certain value or less or applying the braking force to the own vehicle 100 in addition to executing the second avoiding steering process.

Figure 4A:
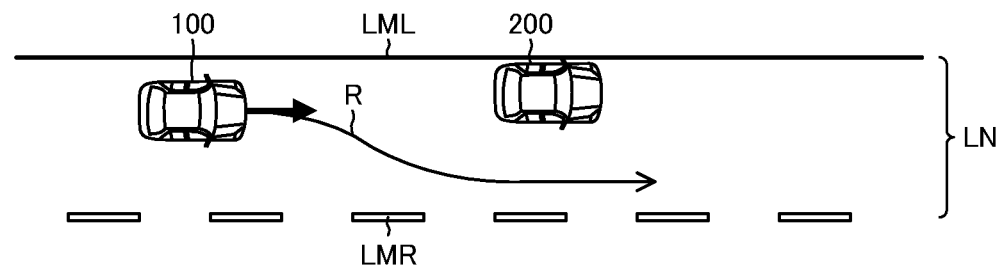
FIG. 4A is a view which shows a scene that an execution of a steering process or an avoiding steering process of steering the own vehicle to move the own vehicle along the avoidance route, is started.
Figure 4B:
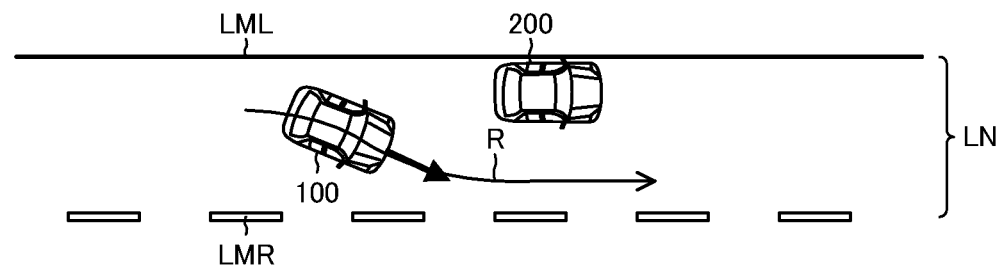
FIG. 4B is a view which shows a scene that the avoiding steering process is being executed.
Figure 4C:
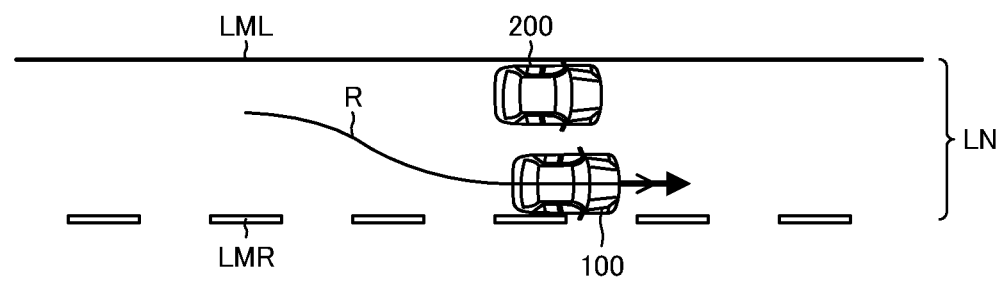
FIG. 4C is a view which shows a scene that an execution of a steering avoidance control is terminated.

When (i) the avoidance route R (i.e., the recommended avoidance route Rrec or the target avoidance route Rtgt) is set as shown in FIG. 4A, and (ii) an execution of the avoiding steering process (i.e., the first avoiding steering process or the second avoiding steering process) is started, the own vehicle 100 is steered to move along the avoidance route R as shown in FIG. 4B, and avoids the collision with the object 200 as shown in FIG. 4C.

It should be noted that the vehicle collision avoidance assist apparatus 10 does not execute the avoiding steering process (i.e., the first avoiding steering process or the second avoiding steering process) when (i) the width of the own vehicle moving lane LN is narrow and thus, there is no space to move the own vehicle 100 to avoid the object 200 at the side of the object 200 and thus, (ii) the vehicle collision avoidance assist apparatus 10 cannot set the recommended avoidance route Rrec or the target avoidance route Rtgt. Also, the vehicle collision avoidance assist apparatus 10 does not execute the avoiding steering process (i.e., the first avoiding steering process or the second avoiding steering process) when (i) the vehicle collision avoidance assist apparatus 10 does not recognize the left lane marking LML at the left side of the own vehicle 100 or the right lane marking LMR at the right side of the own vehicle 100 and thus, (ii) the vehicle collision avoidance assist apparatus 10 cannot set the recommended avoidance route Rrec or the target avoidance route Rtgt. That is, when a forbidding condition that the recommended avoidance route Rrec or the target avoidance route Rtgt cannot be set, is satisfied, the vehicle collision avoidance assist apparatus 10 does not execute the avoiding steering process.

It should be noted that one or more of conditions C1 to C21 below may be used as the forbidding condition.

A condition C1 is a condition that the vehicle collision avoidance assist apparatus 10 cannot realize the avoiding steering process (the first avoiding steering process of the second avoiding steering process) due to a fact that devices such as the steering apparatus 23 used to realize the avoiding steering process are malfunctioned.

A condition C2 is a condition that when the vehicle collision avoidance assist apparatus 10 is configured to execute an autonomous brake control (PCS), the vehicle collision avoidance assist apparatus 10 cannot realize the autonomous brake control due to a fact that devices such as the braking apparatus 22 used to realize the autonomous brake control are malfunctioned. The autonomous brake control is a control of stopping the own vehicle 100 by forcibly braking the own vehicle 100 before the own vehicle 100 collides with the object ahead of the own vehicle 100 when the probability that the own vehicle 100 collides with the object ahead of the own vehicle 100 has increased to a high level.

A condition C3 is a condition that when the vehicle collision avoidance assist apparatus 10 is configured to execute a sideslip prevention control (VSC), the vehicle collision avoidance assist apparatus 10 cannot realize the sideslip prevention control due to a fact that devices such as the braking apparatus 22 used to realize the sideslip prevention control are malfunctioned. The sideslip prevention control is, for example, a control of stabilizing a moving behavior of the own vehicle 100 by adjusting the driving force PD applied to the own vehicle 100 or individually adjusting the braking forces PB applied to wheels of the own vehicle 100, respectively when the moving behavior of the own vehicle 100 becomes unstable due to steering the own vehicle 100.

A condition C4 is a condition that when the vehicle collision avoidance assist apparatus 10 is configured to execute the autonomous brake control (PCS), the vehicle collision avoidance assist apparatus 10 can stop the own vehicle 100 by the autonomous brake control before the own vehicle 100 collides with the object 200.

A condition C5 is a condition that when (i) the vehicle collision avoidance assist apparatus 10 is configured to execute the autonomous brake control (PCS), and (ii) the vehicle collision avoidance assist apparatus 10 starts executing the autonomous brake control and then, terminates executing the autonomous brake control, a time elapsing since the vehicle collision avoidance assist apparatus 10 terminates executing the autonomous brake control is equal to or shorter than a predetermined time.

A condition C6 is a condition that when the vehicle collision avoidance assist apparatus 10 starts executing the steering avoidance control and then, the vehicle collision avoidance assist apparatus 10 terminates executing the steering avoidance control, a time elapsing since the vehicle collision avoidance assist apparatus 10 terminates executing the steering avoidance control is equal to or shorter than a predetermined time.

A condition C7 is a condition that the vehicle collision avoidance assist apparatus 10 activates or blinks turn signals of the own vehicle 100.

A condition C8 is a condition that when (i) the object 200 is a preceding vehicle, and (ii) the recommended avoidance route Rrec or the target avoidance route Rtgt is a route passing at the left side of the preceding vehicle, left turn signals of the preceding vehicle are activated or blinked. The vehicle collision avoidance assist apparatus 10 can determine, based on the forward information I_F, whether the left turn signals of the preceding vehicle are activated or blinked. It should be noted that the preceding vehicle is a vehicle which moves ahead of the own vehicle 100 in the own vehicle moving lane LN or the moving lane of the own vehicle 100 in the same direction as the moving direction of the own vehicle 100.

A condition C9 is a condition that when (i) the object 200 is the preceding vehicle, and (ii) the recommended avoidance route Rrec or the target avoidance route Rtgt is a route passing at the right side of the preceding vehicle, right turn signals of the preceding vehicle are activated or blinked. The vehicle collision avoidance assist apparatus 10 can determine, based on the forward information I_F, whether the right turn signals of the preceding vehicle are activated or blinked.

A condition C10 is a condition that the accelerator pedal operation amount AP is equal to or greater than a predetermined accelerator pedal operation amount APth.

A condition C11 is a condition that the brake pedal operation amount BP is equal to or greater than a predetermined brake pedal operation amount BPth.

A condition C12 is a condition that the vehicle moving speed V100 of the own vehicle 100 is not within a predetermined range Rv.

A condition C13 is a condition that the relative moving speed dV of the object 200 with respect to the own vehicle 100 is not within a predetermined range Rdv.

A condition C14 is a condition that the lateral acceleration Gy is equal to or greater than a predetermined lateral acceleration Gy_th.

A condition C15 is a condition that the longitudinal acceleration Gx is a positive value, and an absolute value of the longitudinal acceleration Gx is equal to or greater than a predetermined value Gx_th.

A condition C16 is a condition that the longitudinal acceleration Gx is a negative value, and the absolute value of the longitudinal acceleration Gx is equal to or greater than the predetermined value Gx_th.

A condition C17 is a condition that the own vehicle 100 moves along a curving road. The vehicle collision avoidance assist apparatus 10 can determine, based on the forward information I_F, whether the own vehicle 100 moves along the curving road.

A condition C18 is a condition that a lane-markings distance is equal to or longer than a predetermined distance. The lane-markings distance is a distance between the left lane marking LML at the left side of the own vehicle 100 and the right lane marking LMR at the right side of the own vehicle 100. The vehicle collision avoidance assist apparatus 10 can acquire the lane-markings distance, based on the forward information I_F.

A condition C19 is a condition that the recommended avoidance route Rrec or the target avoidance route Rtgt crosses a longitudinally-extending center line of the object 200. The vehicle collision avoidance assist apparatus 10 can determine, based on the forward information IF, whether the recommended avoidance route Rrec or the target avoidance route Rtgt crosses the longitudinally-extending center line of the object 200.

A condition C20 is a condition that the object 200 moves, crossing the recommended avoidance route Rrec or the target avoidance route Rtgt. The vehicle collision avoidance assist apparatus 10 can determine, based on the forward information I_F, whether the object 200 moves, crossing the recommended avoidance route Rrec or the target avoidance route Rtgt.

A condition C21 is a condition that the vehicle collision avoidance assist apparatus 10 can set the recommended avoidance route Rrec or the target avoidance route Rtgt but the vehicle collision avoidance assist apparatus 10 predicts that the vehicle collision avoidance assist apparatus 10 cannot move the own vehicle 100 along the recommended avoidance route Rrec or the target avoidance route Rtgt.

<Termination of Execution of Steering Avoidance Control>

After the vehicle collision avoidance assist apparatus 10 starts executing the avoiding steering process (i.e., the first avoiding steering process or the second avoiding steering process), the vehicle collision avoidance assist apparatus 10 monitors whether a terminating condition becomes satisfied. The terminating condition is a condition that an absolute value of the yaw angle YA becomes equal to or smaller than a predetermined yaw angle YAth. The vehicle collision avoidance assist apparatus 10 continues executing the avoiding steering process (i.e., the first avoiding steering process or the second avoiding steering process) as far as the terminating condition is not satisfied. On the other hand, when the terminating condition becomes satisfied, the vehicle collision avoidance assist apparatus 10 terminates executing the avoiding steering process or the steering avoidance control.

It should be noted that when the vehicle collision avoidance assist apparatus 10 is configured to execute the steering avoidance control and brake and stop the own vehicle 100, the vehicle collision avoidance assist apparatus 10 may be configured to terminate executing the steering avoidance control or the avoiding steering process when the own vehicle 100 stops.

<Stop of Execution of Steering Avoidance Control>

Figure 5A:
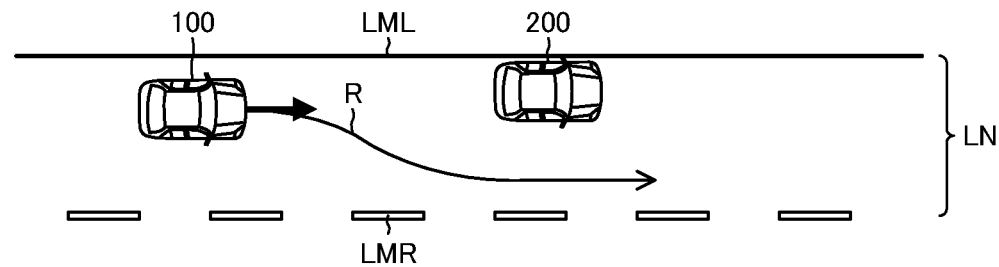
FIG. 5A is a view which shows a scene that the execution of the steering process or the avoiding steering process of steering the own vehicle to move the own vehicle along the avoidance route is started.
Figure 5B:
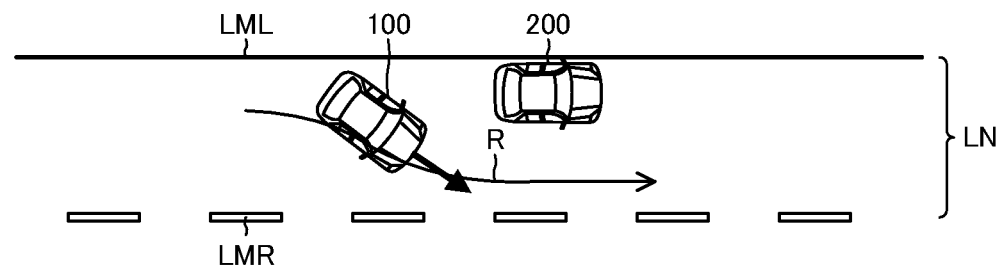
FIG. 5B is a view which shows a scene that a departing amount of the own vehicle from the avoidance route after the execution of the avoiding steering process is started, is increased.
Figure 5C:
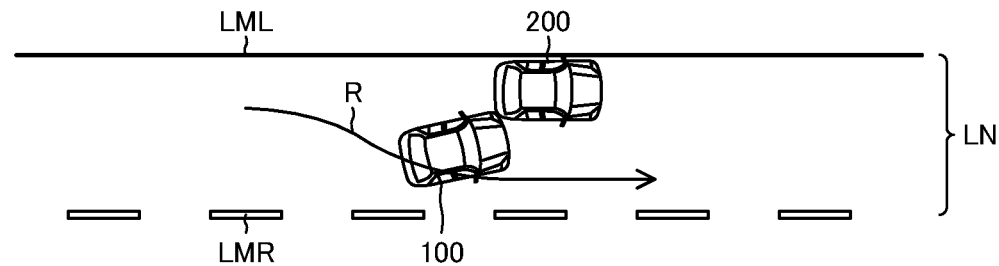
FIG. 5C is a view which shows a scene which may occur when the departing amount of the own vehicle from the avoidance route is increased, and the execution of the avoiding steering process or the steering avoidance control is continued.

After the vehicle collision avoidance assist apparatus 10 sets the avoidance route R (i.e., the recommended avoidance route Rrec or the target avoidance route Rtgt) and starts executing the avoiding steering process (i.e., the first avoiding steering process or the second avoiding steering process) as shown in FIG. 5A, the own vehicle 100 may be deviated or departed from the avoidance route R as shown in FIG. 5B. If the own vehicle 100 is considerably departed from the avoidance route R, and the execution of the avoiding steering process is continued, the own vehicle 100 may collide with the target object 200tgt as shown in FIG. 5C.

Accordingly, after the vehicle collision avoidance assist apparatus 10 starts executing the avoiding steering process, the vehicle collision avoidance assist apparatus 10 acquires a departing amount dD of the own vehicle 100 from the avoidance route R, based on the forward information I_F. When the departing amount dD becomes equal to or greater than a predetermined departing amount dDth, the vehicle collision avoidance assist apparatus 10 stops executing the steering avoidance control.

Figure 6:
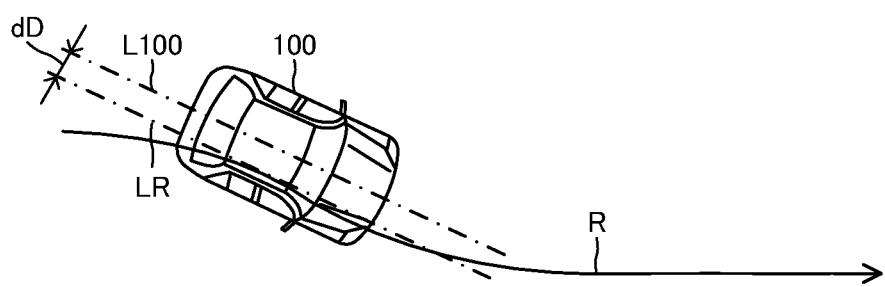
FIG. 6 is a view which shows the departing amount of the own vehicle from the avoidance route.

In this embodiment, as shown in FIG. 6, the departing amount dD of the own vehicle 100 is a distance between a tangential line LR and the own vehicle longitudinal extending center line L100. The tangential line LR is a tangential line at a point on the avoidance route R which corresponds to a current position of the own vehicle 100. FIG. 6 shows the departing amount dD when the own vehicle 100 is departed from the avoidance route R toward the target object 200tgt. In this regard, also when the own vehicle 100 is departed from the avoidance route R opposite to the target object 200tgt, the vehicle collision avoidance assist apparatus 10 acquires, as the departing amount dD, a distance between (i) the tangential line LR at the point on the avoidance route R which corresponds to the current position of the own vehicle 100 and (ii) the own vehicle longitudinal extending center line L100.

Figure 7:
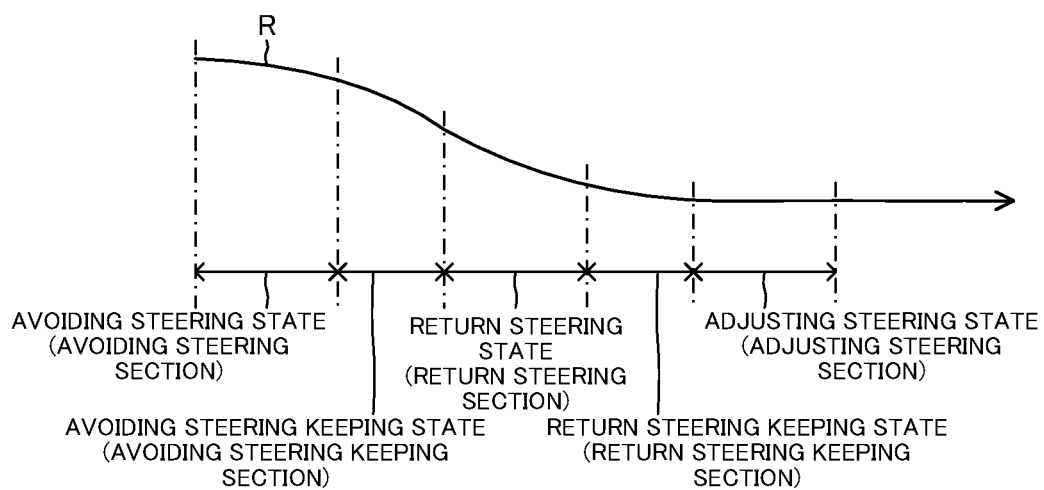
FIG. 7 is a view which shows a relationship between the avoidance route and a steering state.

Further, in this embodiment, the predetermined departing amount dDth is set as described below, depending on a steering state of the own vehicle 100 while the avoiding steering process of the steering avoidance control is executed. As shown in FIG. 7, while the avoiding steering process is executed, the steering state changes in order of an avoiding steering state, an avoiding steering keeping state, a return steering state, a return steering keeping state, and an adjusting steering state. The avoiding steering state is a state of increasing the steering angle SA of the own vehicle 100 to turn the own vehicle 100 right or left to make a situation that the target object 200tgt is not in the own vehicle moving area A100. The avoiding steering keeping state is a state of keeping the steering angle SA which has been increased in the avoiding steering state. The return steering state is a state of decreasing the steering angle SA to make a situation that the own vehicle longitudinal extending center line L100 is parallel to the own vehicle moving lane extending line LLN. The return steering keeping state is a state of keeping the steering angle SA which has been decreased in the return steering state. The adjusting steering state is a state of increasing and decreasing the steering angle SA to adjust the steering angle SA to make a situation that the own vehicle longitudinal extending center line L100 is parallel to the own vehicle moving lane extending line LLN.

Then, the vehicle collision avoidance assist apparatus 10 sets a first departing amount dD1 as the predetermined departing amount dDth to be compared with the departing amount dD when the own vehicle 100 is moved in an avoiding steering section of the avoidance route R in which the steering state is the avoiding steering state. Also, the vehicle collision avoidance assist apparatus 10 sets the first departing amount dD1 as the predetermined departing amount dDth to be compared with the departing amount dD when the own vehicle 100 is moved in a return steering section of the avoidance route R in which the steering state is the return steering state. On the other hand, the vehicle collision avoidance assist apparatus 10 sets a second departing amount dD2 smaller than the first departing amount dD1 as the predetermined departing amount dDth to be compared with the departing amount dD when the own vehicle 100 is moved in an avoiding steering keeping section of the avoidance route R in which the steering state is the avoiding steering keeping state. Also, the vehicle collision avoidance assist apparatus 10 sets the second departing amount dD2 as the predetermined departing amount dDth to be compared with the departing amount dD when the own vehicle 100 is moved in a return steering keeping section of the avoidance route R in which the steering state is the return steering keeping state. Also, the vehicle collision avoidance assist apparatus 10 sets the second departing amount dD2 as the predetermined departing amount dDth to be compared with the departing amount dD when the own vehicle 100 is moved in an adjusting steering section of the avoidance route R in which the steering state is the adjusting steering state.

When the own vehicle 100 is moved in the avoiding steering section of the avoidance route R, the first departing amount dD1 to be compared with the departing amount dD when the own vehicle 100 is departed from the avoidance route R toward the target object 200tgt, may be set to a smaller value than the first departing amount dD1 to be compared with the departing amount dD when the own vehicle 100 is departed from the avoidance route R opposite to the target object 200tgt. In this case, when the own vehicle 100 is moved in the avoiding steering section of the avoidance route R, the first departing amount dD1 set as the predetermined departing amount dDth to be compared with the departing amount dD when the own vehicle 100 is departed from the avoidance route R in an opposite direction to a turning direction of the own vehicle 100 achieved by the avoiding steering process, is set to a smaller value than the first departing amount dD1 set as the predetermined departing amount dDth to be compared with the departing amount dD when the own vehicle 100 is departed from the avoidance route R in the same direction as the turning direction of the own vehicle 100 achieved by the avoiding steering process.

Further, when the own vehicle 100 is moved in the avoiding steering keeping section of the avoidance route R, the second departing amount dD2 to be compared with the departing amount dD when the own vehicle 100 is departed from the avoidance route R toward the target object 200tgt, may be set to a smaller value than the second departing amount dD2 to be compared with the departing amount dD when the own vehicle 100 is departed from the avoidance route R opposite to the target object 200tgt. In this case, when the own vehicle 100 is moved in the avoiding steering keeping section of the avoidance route R, the second departing amount dD2 set as the predetermined departing amount dDth to be compared with the departing amount dD when the own vehicle 100 is departed from the avoidance route R in the opposite direction to the turning direction of the own vehicle 100 achieved by the avoiding steering process, is set to a smaller value than the second departing amount dD2 set as the predetermined departing amount dDth to be compared with the departing amount dD when the own vehicle 100 is departed from the avoidance route R in the same direction as the turning direction of the own vehicle 100 achieved by the avoiding steering process.

Furthermore, when the own vehicle 100 is moved in the return steering section of the avoidance route R, the first departing amount dD1 to be compared with the departing amount dD when the own vehicle 100 is departed from the avoidance route R opposite to the target object 200tgt, may be set to a smaller value than the first departing amount dD1 to be compared with the departing amount dD when the own vehicle 100 is departed from the avoidance route R toward to the target object 200tgt. In this case, when the own vehicle 100 is moved in the return steering section of the avoidance route R, the first departing amount dD1 set as the predetermined departing amount dDth to be compared with the departing amount dD when the own vehicle 100 is departed from the avoidance route R in the opposite direction to the turning direction of the own vehicle 100 achieved by the avoiding steering process, is set to a smaller value than the first departing amount dD1 set as the predetermined departing amount dDth to be compared with the departing amount dD when the own vehicle 100 is departed from the avoidance route R in the same direction as the turning direction of the own vehicle 100 achieved by the avoiding steering process.

Furthermore, when the own vehicle 100 is moved in the return steering keeping section of the avoidance route R, the second departing amount dD2 to be compared with the departing amount dD when the own vehicle 100 is departed from the avoidance route R opposite to the target object 200tgt, may be set to a smaller value than the second departing amount dD2 to be compared with the departing amount dD when the own vehicle 100 is departed from the avoidance route R toward the target object 200tgt. In this case, when the own vehicle 100 is moved in the return steering keeping section of the avoidance route R, the second departing amount dD2 set as the predetermined departing amount dDth to be compared with the departing amount dD when the own vehicle 100 is departed from the avoidance route R in the opposite direction to the turning direction of the own vehicle 100 achieved by the avoiding steering process, is set to a smaller value than the second departing amount dD2 set as the predetermined departing amount dDth to be compared with the departing amount dD when the own vehicle 100 is departed from the avoidance route R in the same direction as the turning direction of the own vehicle 100 achieved by the avoiding steering process.

Figure 8:
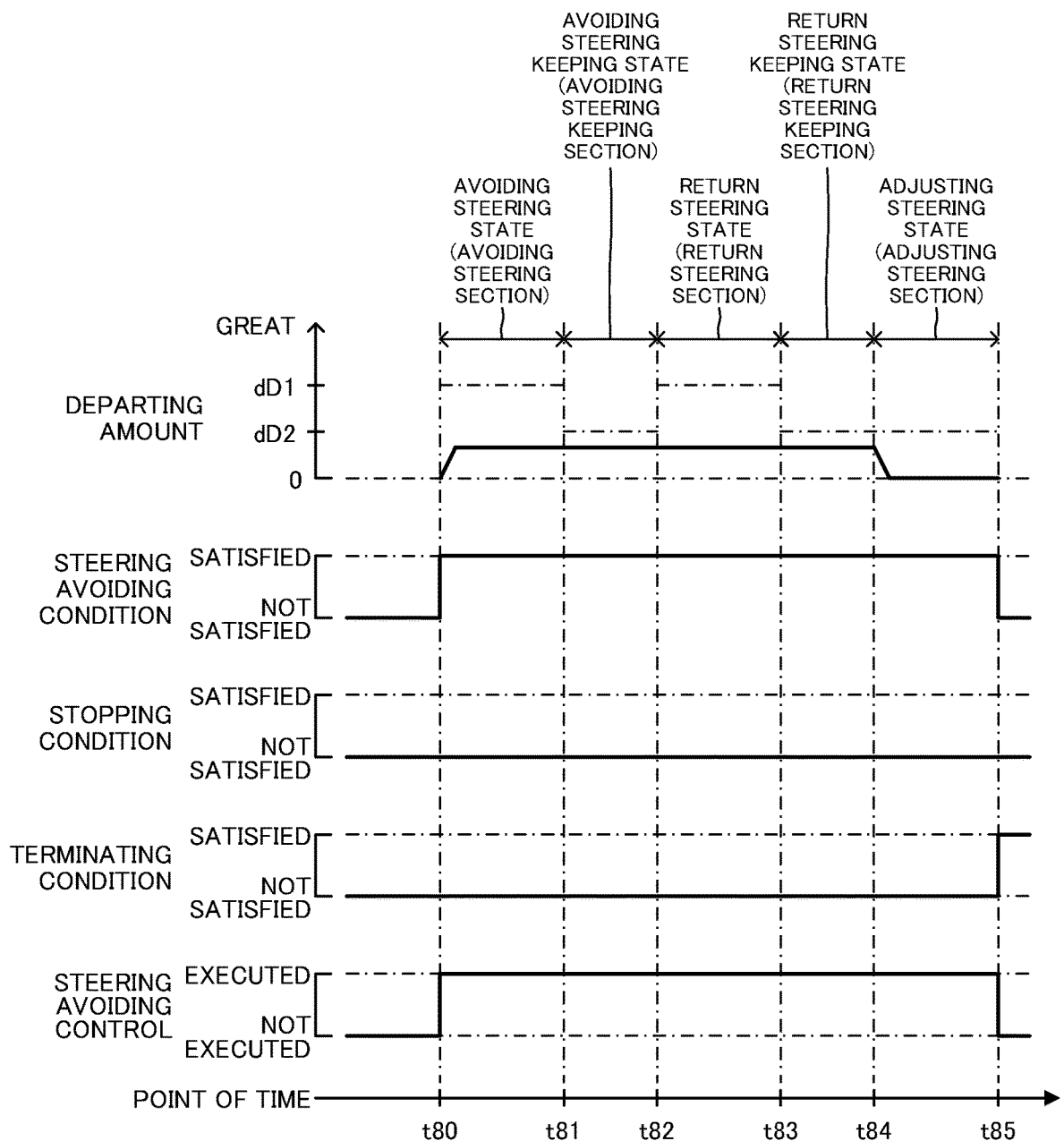
FIG. 8 is a view which shows a time chart which illustrates changes of the departing amount of the own vehicle from the avoidance route, etc. when the execution of the steering avoidance control is terminated, not stopped halfway.

Thus, when the departing amount dD of the own vehicle 100 does not become equal to or greater than the predetermined departing amount dDth until a terminating condition becomes satisfied after the execution of the avoiding steering process is started, as shown in FIG. 8, the vehicle collision avoidance assist apparatus 10 terminates executing the steering avoidance control when the terminating condition becomes satisfied.

In an example shown in FIG. 8, at a point of time t80, the steering avoidance condition becomes satisfied. Thus, the execution of the steering avoidance control is started, and the steering state becomes the avoiding steering state by the avoiding steering process. While the steering state is the avoiding steering state, the predetermined departing amount dDth is set to the first departing amount dD1.

In the example shown in FIG. 8, when the steering state becomes the avoiding steering state at the point of time t80, the departing amount dD of the own vehicle 100 is increased. In this example, the departing amount dD is kept smaller than the first departing amount dD1. Thus, the execution of the avoiding steering process is continued.

Then, at a point of time t81, the steering state becomes the avoiding steering keeping state. Then, at a point of time t82, the steering state becomes the return steering state. While the steering state is the avoiding steering keeping state from the point of time t81 to the point of time t82, the predetermined departing amount dDth is set to the second departing amount dD2 smaller than the first departing amount dD1. In this example, the departing amount dD of the own vehicle 100 is kept smaller than the second departing amount dD2. Thus, the execution of the avoiding steering process is continued.

Then, after the steering state becomes the return steering state at the point of time t82, the steering state becomes the return steering keeping state at a point of time t83. While the steering state is the return steering state from the point of time t82 to the point of time t83, the predetermined departing amount dDth is set to the first departing amount dD1. In this example, the departing amount dD of the own vehicle 100 is kept smaller than the first departing amount dD1. Thus, the execution of the avoiding steering process is continued.

Then, after the steering state becomes the return steering keeping state at the point of time t83, the steering state becomes the adjusting steering state at a point of time t84. While the steering state is the return steering keeping state from the point of time t83 to the point of time t84, the predetermined departing amount dDth is set to the second departing amount dD2 smaller than the first departing amount dD1. In this example, the departing amount dD of the own vehicle 100 is kept smaller than the second departing amount dD2. Thus, the execution of the avoiding steering process is continued.

Then, after the steering state becomes the adjusting steering state at the point of time t84, the predetermined departing amount dDth is set to the second departing amount dD2. In this example, the departing amount dD of the own vehicle 100 is kept smaller than the second departing amount dD2. Thus, the execution of the avoiding steering process is continued.

Then, when the terminating condition becomes satisfied at a point of time t85, the execution of the steering avoidance control is terminated.

Figure 9:
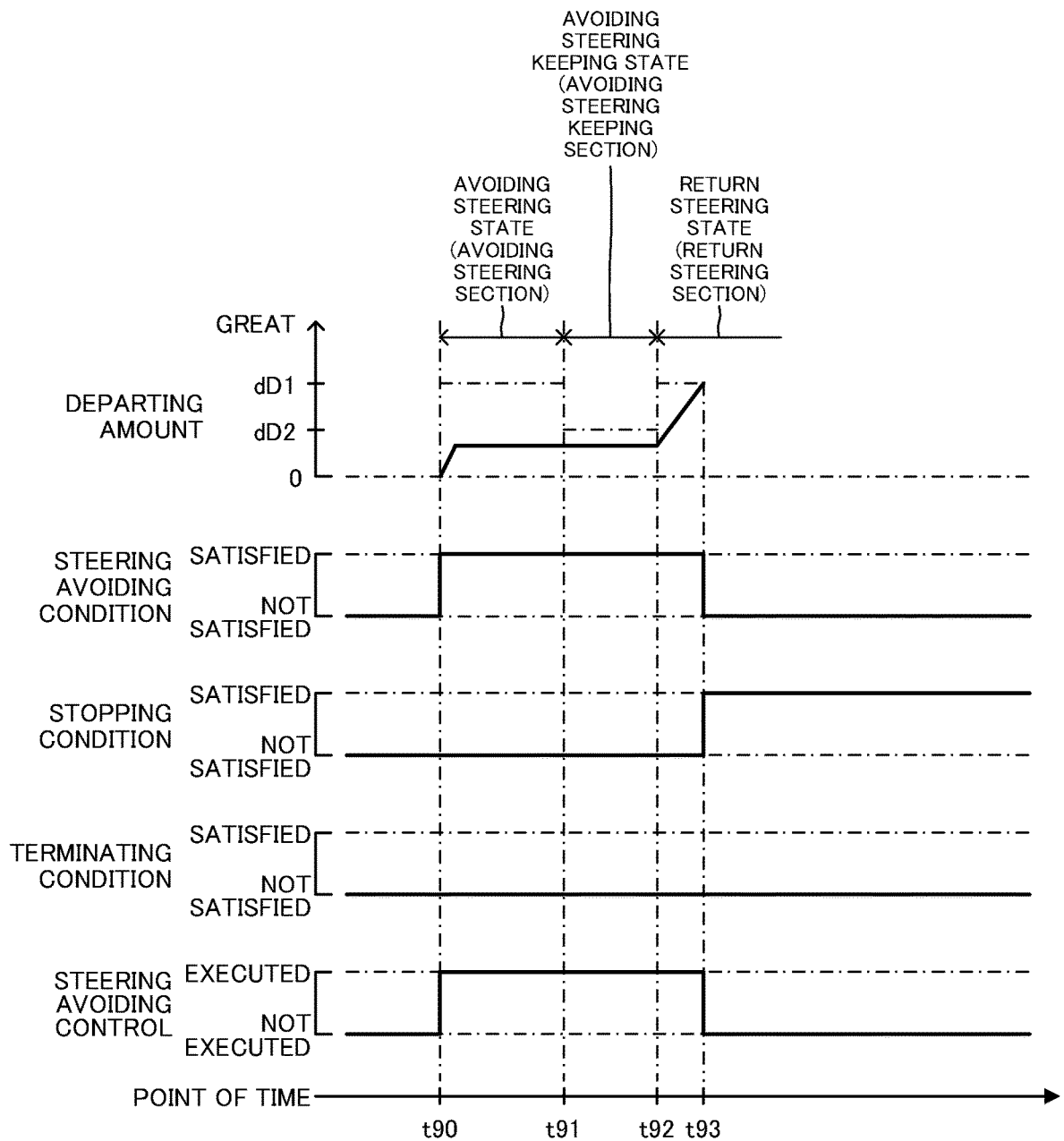
FIG. 9 is a view which shows a time chart which illustrates the changes of the departing amount of the own vehicle from the avoidance route, etc. when the execution of the steering avoidance control is stopped halfway.

On the other hand, when the execution of the avoiding steering process is started, and the departing amount dD of the own vehicle 100 becomes equal to or greater than the predetermined departing amount dDth before the terminating condition becomes satisfied, as shown in FIG. 9, the vehicle collision avoidance assist apparatus 10 stops executing the steering avoidance control. That is, when a stopping condition that the execution of the avoiding steering process is started, and the departing amount dD of the own vehicle 100 becomes equal to or greater than the predetermined departing amount dDth before the terminating condition becomes satisfied, becomes satisfied, the vehicle collision avoidance assist apparatus 10 stops executing the steering avoidance control.

In an example shown in FIG. 9, at the point of time t90, the steering avoidance condition becomes satisfied. Thus, the execution of the steering avoidance control is started, and the steering state becomes the avoiding steering state by the avoiding steering process. While the steering state is the avoiding steering state, the predetermined departing amount dDth is set to the first departing amount dD1.

Also, in the example shown in FIG. 9, the steering state becomes the avoiding steering state at the point of time t90, and the departing amount dD of the own vehicle 100 is increased. In this example, the departing amount dD of the own vehicle 100 is kept smaller than the first departing amount dD1. Thus, the execution of the avoiding steering process is continued.

Then, at a point of time t91, the steering state becomes the avoiding steering keeping state. Then, at a point of time t92, the steering state becomes the return steering state. While the steering state is the avoiding steering keeping state from the point of time t91 to the point of time t92, the predetermined departing amount dDth is set to the second departing amount dD2 smaller than the first departing amount dD1. In this example, the departing amount dD of the own vehicle 100 is kept smaller than the second departing amount dD2. Thus, the execution of the avoiding steering process is continued.

Then, when the steering state becomes the return steering state, the predetermined departing amount dDth is set to the first departing amount dD1. Then, at a point of time t93, the departing amount dD of the own vehicle 100 reaches the first departing amount dD1, and the stopping condition becomes satisfied. Thus, the execution of the steering avoidance control is stopped.

Effects

As described above, the avoidance route R is set, and the execution of the avoiding steering process is started. Thereafter, if the own vehicle 100 is considerably departed from the avoidance route R, and the execution of the avoiding steering process is continued, the own vehicle 100 may collide with the object. With the vehicle collision avoidance assist apparatus 10, when the departing amount dD becomes equal to or greater than the predetermined departing amount dDth, the execution of the steering avoidance control is stopped. Thereby, the collision of the own vehicle 100 with the object 200 can be prevented when the own vehicle 100 is considerably departed from the avoidance route R.

Further, while the own vehicle 100 is moved along the avoidance route R by the avoiding steering process, the steering angle SA of the own vehicle 100 is increased, decreased, or kept. When the own vehicle 100 is properly moved by the avoiding steering process, the departing amount dD of the own vehicle 100 from the avoidance route R with the steering angle SA of the own vehicle 100 being increased and decreased, tends to be greater than the departing amount dD of the own vehicle 100 from the avoidance route R with the steering angle SA of the own vehicle 100 being kept. That is, even when the own vehicle 100 is properly moved by the avoiding steering process, the departing amount dD varies, depending on which section of the avoidance route R the own vehicle 100 is moved. Thus, if the predetermined departing amount dDth is set to a fixed value, independently of whether the steering angle SA of the own vehicle 100 being increased, decreased or kept by the avoiding steering process, the execution of the steering avoidance control is not stopped even when the execution of the steering avoidance control should be stopped, or the execution of the steering avoidance control is stopped even when the execution of the steering avoidance control should not be stopped. With the vehicle collision avoidance assist apparatus 10, the predetermined departing amount dDth is set for each of the sections of the avoidance route R, i.e., the avoiding steering section, the avoiding steering keeping section, the return steering section, the return steering keeping section, and the adjusting steering section. Thereby, whether to stop executing the execution of the steering avoidance control can be appropriately determined.

It should be noted that the vehicle collision avoidance assist apparatus 10 may be configured to stop executing the steering avoidance control when the driver input torque TQdr becomes equal to or greater than a relatively great predetermined torque TQth while the vehicle collision avoidance assist apparatus 10 executes the steering avoidance control.

<Specific Operations of Vehicle Collision Avoidance Assist Apparatus>

Figure 10:
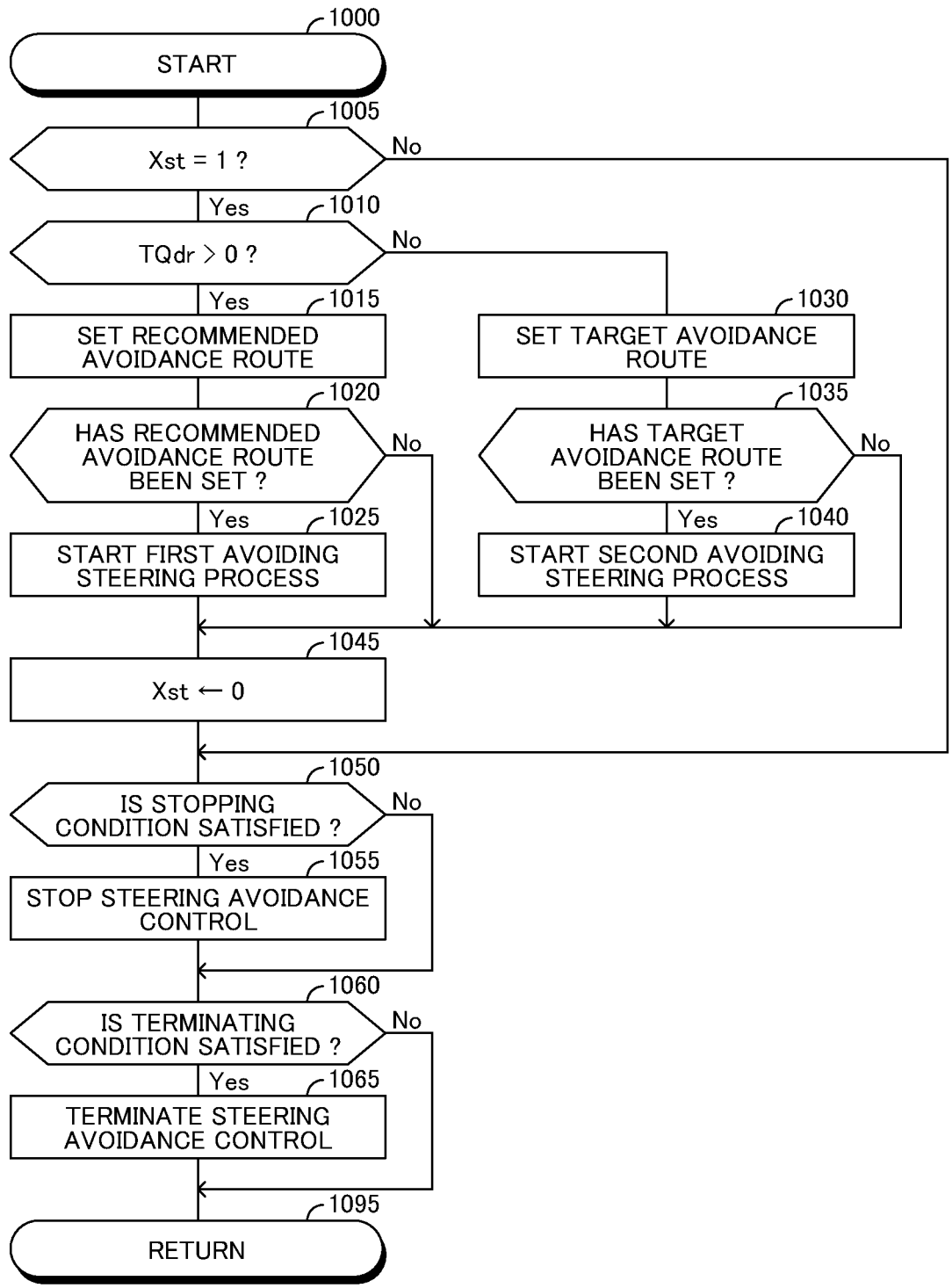
FIG. 10 is a view which shows a flowchart of a routine executed by the vehicle collision avoidance assist apparatus according to the embodiment of the invention.

Next, specific operations of the vehicle collision avoidance assist apparatus 10 will be described. The CPU of the ECU 90 of the vehicle collision avoidance assist apparatus 10 is configured or programmed to execute a routine shown in FIG. 10 each time a predetermined time elapses. Thus, at a predetermined timing, the CPU starts executing a process from a step 1000 of the routine shown in FIG. 10 and proceeds with the process to a step 805 to determine whether a value of a steering avoiding condition flag Xst is "1". The value of the steering avoiding condition flag Xst is set to "1" when the steering avoiding condition becomes satisfied.

When the CPU determines "Yes" at the step 1005, the CPU proceeds with the process to a step 1010 to determine whether the driver input torque TQdr is greater than zero. When the CPU determines "Yes" at the step 1010, the CPU proceeds with the process to a step 1015 to set the recommended avoidance route Rrec. Then, the CPU proceeds with the process to a step 1020 to determine whether the CPU has set the recommended avoidance route Rrec.

When the CPU determines "Yes" at the step 1020, the CPU proceeds with the process to a step 1025 to start executing the first avoiding steering process. Then, the CPU proceeds with the process to a step 1045. On the other hand, when the CPU determines "No" at the step 1020, the CPU proceeds with the process directly to the step 1045. In this case, the execution of the first avoiding steering process is not started.

Further, when the CPU determines "No" at the step 1010, the CPU proceeds with the process to a step 1030 to set the target avoidance route Rtgt. Then, the CPU proceeds with the process to a step 1035 to determine whether the CPU has set the target avoidance route Rtgt. When the CPU determines "Yes" at the step 1035, the CPU proceeds with the process to a step 1040 to start executing the second avoiding steering process. Then, the CPU proceeds with the process to the step 1045. On the other hand, when the CPU determines "No" at the step 1035, the CPU proceeds with the process directly to the step 1045. In this case, the execution of the second avoiding steering process is not started.

When the CPU proceeds with the process to the step 1045, the CPU sets the value of the steering avoiding condition flag Xst to "0". Then, the CPU proceeds with the process to a step 1050.

Further, when the CPU determines "No" at the step 1005, the CPU proceeds with the process directly to the step 1050.

When the CPU proceeds with the process to the step 1050, the CPU determines whether the stopping condition becomes satisfied. When the CPU determines "Yes" at the step 1050, the CPU proceeds with the process to a step 1055. At the step 1055, when the CPU executes the avoiding steering process (i.e., the first avoiding steering process or the second avoiding steering process), the CPU stops executing the steering avoidance control by stopping executing the avoiding steering process. Then, the CPU proceeds with the process to a step 1060. On the other hand, when the CPU determines "No" at the step 1050, the CPU proceeds with the process directly to the step 1060. At this time, when the CPU executes the avoiding steering process (i.e., the first avoiding steering process or the second avoiding steering process), the CPU continues executing the avoiding steering process.

When the CPU proceeds with the process to the step 1060, the CPU determines whether the terminating condition becomes satisfied. When the CPU determines "Yes" at the step 1060, the CPU proceeds with the process to a step 1065. At the step 1065, when the CPU executes the avoiding steering process (i.e., the first avoiding steering process or the second avoiding steering process), the CPU terminates executing the steering avoidance control by terminating executing the avoiding steering process. Then, the CPU proceeds with the process to a step 1095 to terminate executing the process of this routine once. On the other hand, when the CPU determines "No" at the step 1060, the CPU proceeds with the process directly to the step 1095 to terminate executing the process of this routine once. At this time, when the avoiding steering process (i.e., the first avoiding steering process or the second avoiding steering process) is executed, the execution of the avoiding steering process is continued.

The specific operations of the vehicle collision avoidance assist apparatus 10 have been described.

It should be noted that the invention is not limited to the aforementioned embodiments, and various modifications can be employed within the scope of the invention.

What is claimed is:

1. A vehicle collision avoidance assist apparatus, comprising an electronic control unit configured to execute a steering avoidance control of:
   when an index value representing a probability of collision of an own vehicle with an object ahead of the own vehicle becomes equal to or greater than a predetermined index value, setting an avoidance route for avoiding the collision of the own vehicle with the object in a lane in which the own vehicle moves; and
   executing an avoiding steering process of forcibly steering the own vehicle so as to move the own vehicle along the avoidance route,
   wherein the electronic control unit is configured to stop an execution of the steering avoidance control based on a departing amount of the own vehicle from the avoidance route becoming equal to or greater than a predetermined departing amount while the electronic control unit executes the steering avoidance control, and
   wherein the predetermined departing amount is set for each of sections of the avoidance route.

2. The vehicle collision avoidance assist apparatus as set forth in claim 1,
   wherein the sections of the avoidance route include (i) at least one steering section of the avoidance route that a steering angle of the own vehicle is increased or decreased by the avoiding steering process and (ii) at least one steering keeping section of the avoidance route that the steering angle of the own vehicle is kept,
   wherein a first departing amount is set as the predetermined departing amount when the own vehicle is moved in the steering section of the avoidance route by the avoiding steering process, and
   wherein a second departing amount smaller than the first departing amount is set as the predetermined departing amount when the own vehicle is moved in the steering keeping section of the avoidance route by the avoiding steering process.

3. The vehicle collision avoidance assist apparatus as set forth in claim 1, wherein the predetermined departing amount set when the own vehicle is departed from the avoidance route in an opposite direction to a turning direction of the own vehicle achieved by the avoiding steering process, is smaller than the predetermined departing amount set when the own vehicle is departed from the avoidance route in the same direction as the turning direction of the own vehicle achieved by the avoiding steering process.

4. The vehicle collision avoidance assist apparatus as set forth in claim 1,
- wherein the index value is a predicted reaching time which is a time predictively taken for the own vehicle to reach the object,
- wherein the index value increases as the predicted reaching time decreases,
- wherein the predicted reaching time is acquired, based on (i) a distance between the own vehicle and the object and (ii) a relative moving speed of the own vehicle with respect to the object, and
- wherein the steering avoidance control is executed when the predicted reaching time becomes a predetermined predicted reaching time which corresponds to the predetermined index value.

\* \* \* \* \*